May 19, 1970  E. H. NEEMEYER  3,512,750
GATE VALVE FOR IRRIGATION PIPES
Filed March 19, 1969

INVENTOR
ERVIN H. NEEMEYER
BY *Hiram A Sturges,*
*Agent*

United States Patent Office 3,512,750
Patented May 19, 1970

3,512,750
GATE VALVE FOR IRRIGATION PIPES
Ervin H. Neemeyer, Rte. 1, Box 79,
Columbus, Nebr. 68601
Filed Mar. 19, 1969, Ser. No. 808,488
Int. Cl. F16k 51/00
U.S. Cl. 251—145          10 Claims

ABSTRACT OF THE DISCLOSURE

An irrigation valve mounted in a side of an irrigation pipe comprising an annular valve body having a substantially cylindrical portion received in a circular pipe opening, a gate at the inner end of the valve, and means mounting the gate in a manner making possible maximum flow while making also possible the insertion of the valve into operational position by passage through the circular pipe opening.

FIELD OF THE INVENTION

The valve of this invention is in the field of irrigation valves of the type designed for economical mounting in a single circular opening in a pipe. This is a field in which maximum flow but minimum constriction of the valve body flow passage is important.

DESCRIPTION OF THE PRIOR ART

Sliding gate valves of the prior art have necessarily required pipe openings which are elongated. The light aluminum of irrigation pipes is excessively weak in the areas at the top and bottom of each oblong hole, and these areas tend to bend outward when water pressure is high. This is much less the case when a round pipe hole is used in which the walls of the opening are of equal strength on all sides. But, heretofore, no sliding gate valve has been invented which can be mounted in a round hole.

Another disadvantage of gate valves of the prior art is that their installation has required, first, the insertion of an elongated valve body endwise through the elongated pipe opening, secondly, centering the valve body with respect to the opening, and then using attachment means to draw a flange on the inner side of the valve body up against a flexible gasket on the inside of the pipe. However, this had a disadvantage in that it was not possible for a valve body flange means extending away from the valve body to overlap the top and bottom of the pipe opening, and so it was necessary to depend only upon the flexible gasket to put enough pressure on those areas of the pipe which were at the top and bottom of the openings to prevent leaking. This left long areas at each of the elongated pipe openings toward which the gasket is not directly pressed by the flange means.

So, for these reasons, sliding gate valves have been limited in their use to forty pounds pressure or less when used with an aluminum irrigation pipe of conventional gauge. With larger pressures, sliding gate valves have tended to "blow out."

The higher pressures tend to bend outward the weak aluminum pipe at the top and bottom of the elongated holes where the metal is less supported and excessively weak.

For these reasons, the most popular valves on the market have been rotary valves. Rotary valves have each been insertable completely into an opening in a pipe during mounting, as was made possible by having top and bottom parts of an inner flange extend no farther from the axis of the valve body than the radius of the round opening in the pipe. It was possible to have the flange extend beyond the side walls of the pipe opening on the right-hand and left-hand sides of the opening, however, because of the possibility of inserting the valve completely into the pipe with the axis of its body turned lengthwise of the pipe during insertion. In such valves the inner sides of the valve body are threaded in order to receive the threaded outside of a valve core. A valve seat or disc has been disposed spaced inwardly of the pipe from the flange and connected to the rotary valve core by legs of minimum dimension so as to keep as much of an opening through the valve core free of obstruction as possible for getting desired flow.

But rotary valves have had the disadvantage that the amount of the rate of flow possible through them has been limited. This has been because the opening between the valve seat or disc and the valve core has been limited by the factor that the total distance from the outer end of the valve core to the inner end of the valve seat or disc must be less than the diameter of the round pipe opening, or else the valve cannot be inserted sideways into a pipe by inserting it while the axis of the core is held sideways or parallel to the pipe during insertion.

A still more recent rotary screw gate valve has had a greater spacing of its seat or disc from its core for greater flow opening therebetween, but this has only been made possible by a different form of flange construction which on three sides extends out from the axis of the valve core which each extend a distance out from the axis of the valve core which is very little and necessarily lesser than the radius of the pipe opening. As a result, this form of screw gate valve, while permitting greater flow, tends to experience more blow-outs.

When a valve "blows out," it is a very expensive nuisance.

When a rotary screw-type gate valve blows out, the movement of the valve out through the torn sides of the opening causes a damage which leads to the need for welding of the tear. Even in cases in which the valve is blown out by a distortion or bending of the walls of the bent aluminum pipe adjacent the opening, the amount of labor necessary to reform the pipe to its original curvature is considerable. For example, welding is necessary once a bent-out portion of pipe has been put into its original shape, it must be patched by extra aluminum welded onto the area because the once-bent pipe area is too weak to stand the water pressure.

This welding has a high labor cost and so blow-outs of rotary screw-type water gate valves are a costly problem.

Crop rows are also destroyed by "blow-outs." The great volume of water that spurts out of a pipe after a valve has blown out can cause the destruction of about ten crop rows or ridges for a considerable area back from the pipe. And so there is also the labor cost of rebuilding the rows damaged.

The spurting of water out of the pipe opening after a valve has blown out does not come out straight, but slightly at an angle because of the bend in the pipe from distortion of the pipe during blow-out and this is the reason so many crop rows are destroyed and must be replaced.

SUMMARY OF THE INVENTION

An irrigation valve mounted in a side of an irrigation pipe comprising an annular valve body having a substantially cylindrical portion received in a circular pipe opening, a gate at the inner end of the valve, and means mounting the gate in a manner making possible maximum flow while making also possible the insertion of the valve into operational position by passage through the circular pipe opening, means slidably mounting the gate on said body comprising flange means for movement of said gate across said body transversely of an axis of a flow passage through said body, the body having a resilient gasket between said gate and said body, and further in combination with a pipe having a circular opening through which said body extends, a control member attached to the forward side of said gate, said control member serving also as a water guide control member because it extends generally parallel to the flow passage axis as seen from the top of a pipe so that water flowing through the passage tends to follow and be guided by the water guide control member, the means for attaching the gate to the flanges comprising grooves in the flanges slidably receiving the gate, the body having flange means on substantially all sides thereof providing a shoulder receiving a resilient gasket thereagainst for engaging the inner side of the pipe, a nut and saddle-like bearing member for drawing said shoulder toward the inner side of said pipe to compress said gasket, the body having flange means extending away from the axis of its flow passage a greater distance on the right and left sides of the body than on the top and bottom sides of the body, the control member being disposed substantially midway between the gate grooves and between the top and bottom of the flow passage so as to arrive at an open position which permits maximum opening of said flow passage, recess means in that edge of said gate which is closest to said control member and disposed between said control member and one or both of the top and bottom corners of the adjacent edge of said gate, whereby a maximum flow is preserved when said gate is open since the only part of said gate which laps said flow passage when said gate is open is a minimum amount of gate material for the support of said control member, said recess means being two recesses, one on each side of said control member, for disposing the said corners of said gate edge as far into said grooves as possible for good support of said sliding gate.

DESCRIPTION OF THE PREFERRED EMBODIMENT

Figure 1:
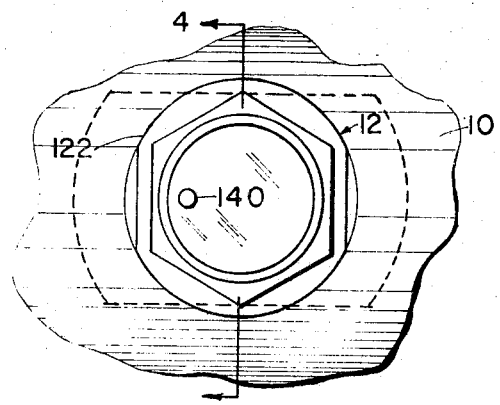
FIG. 1 is a frontal elevation of a gate valve of this invention shown as mounted in a portion of a pipe.

Referring to FIG. 1, an irrigation pipe is there shown at 10 and the gate valve of this invention is mounted thereon and generally indicated at 12.

The irrigation pipe 10 will be understood to be elongated from the right to the left as seen in FIG. 1 and it will be understood to have a plurality of the valves 12 mounted in spaced positions along the length thereof for distributing irrigation water. The pipe 10 has a circular opening 20 extending through the side of the pipe and through the opening 20 an annular valve body 30 is provided having a flow passage 32 therethrough and having a substantially cylindrical threaded external surface 38 at its outer end.

Figure 4:
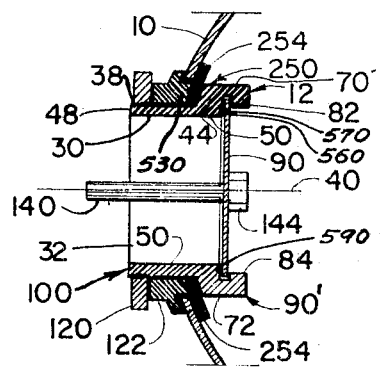
FIG. 4 is a sectional view taken along the line 4—4 of FIG. 1.

The substantially cylindrical surface 38 has an axis 40, best seen in FIG. 4, extending through the flow passage 32.

The body 30 has an inner end 44 and an outer end 48 spaced along the axis 40 with the walls 50 of the flow passage 32 being disposed longitudinally of the axis 40.

First and second flange means shown at 70 and 72 can also be called top and bottom flanges and they extend respectively outwardly from the two opposite top and bottom sides of the body 30. Each flange 70 and 72 is attached to the inner end of the body 30 and each has a horizontally extending groove 82 and 84 respectively which face the axis 40 into which the horizontal top and bottom edges 86 and 88 respectively of a gate 90 are received, with the gate 90 extending across the inner end of the body 30. As thus described, the gate 90 can move across the body transversely of the axis 40 to open and close the passage 32.

The body 30 together with the flanges 70 and 72 form a flange assembly or flange means generally indicated at 90', all form what can be called a stationary assembly generally indicated at 100, and it will be understood that a later described nut 120 and a later described gasket 122 do not form parts of the stationary assembly.

Now that the stationary assembly 100 has been defined, we can say that the stationary assembly is of no greater dimension as measured along the axis 40 than the diameter of the pipe opening 20 to permit the insertion into the pipe, as later described.

An elongated water guide member 140 is attached to the gate 90 by means of a nut 144 threadedly attached to the innermost side of the water guide member 140 which extends through the gate 90 and is threaded, as seen at 126.

The elongated water guide member 140 extends generally parallel to the axis 40 particularly as seen from the side of the body 30 which is to one side of the line of sliding movement of the gate which can be defined as along either edge 86 or 88 thereof, so that water flowing through the passage 32 tends to follow and be guided by the water guide member 140 and tends to shoot straight out from the pipe, as the pipe is viewed from the top or the bottom thereof. This is important as water flowing straight between the desired ridges of row crop does not wash away the ridges, whereas water that would shoot at an angle would tend to strike the ridges and wash them out, causing water to flow along an undesired pathway. To insert the valve through the opening 120 in the pipe, the valve is passed through the pipe opening in a direction transversely of the axis 40. In a sense, the insertion of the valve is sideways. After insertion, the valve is turned ninety degrees until its axis 40 is transversely of the pipe 10, and then it is pulled through the opening 20 in the pipe to let the gasket 122 and nut 120 be installed.

To make this insertion possible, it is necessary that the entire distance from the innermost part of the valve to the outermost part of the valve, as measured from the inner side of the nut 144 to the outer end of the water guide 140, be less than the diameter of the opening 20.

Also, to make this type of insertion possible, it is necessary that the upper side of the upper flange 70 be spaced a distance from the lower side of the lower flange 72 which is a distance no greater than the diameter of the opening 20 of the pipe.

Since the diameter of the opening 20 is greater than the distance from the top of the top flange 70 to the bottom of the bottom flange 72, it is desirable that some other flange means be provided in order to lap over the inner side of the pipe to hold the valve more firmly in place. This is accomplished by right and left flange means seen at 200 in FIG. 2 and shown partially in full and partially in dotted lines at 202 in FIG. 3 respectively.

The right and left flange means 200 and 202 can extend outwardly from the axis 40 a much greater distance than the top and bottom flanges 70 and 72, as is made possible because of the manner of insertion of the valve by extending it into the pipe sideways before turning it ninety degrees to put it into the position shown in FIG. 4.

It is desirable that the right and left flange means 200 and 202 be continuous with and join the top and bottom flange means 70 and 72 to form a continuous shoulder as indicated by the numeral 250 in FIG. 4 and against which an inner gasket 254 can be pressed for support of the inner side of the gasket at a time when the outer side of the gasket engages the inner side of the pipe 10.

The outer gasket 122 is annular and circular, as is also the inner gasket 254.

The outer gasket 122 is pressed against the outer side of the pipe by the nut 120 and the gaskets 122 and 254 both extend outwardly away from the axis 40 beyond the edges of the opening 20. This does not interfere with insertion of the valve through the opening 20, however, because the inner gasket 254 is flexible enough to bend as it passes through the opening 20.

The water guide member 140 can also serve as a handle so that a person reaching for it with his fingers can set the position of the gate 90 so that the gate 90 either completely closes or partially opens the opening or flow passage 32.

Figure 3:
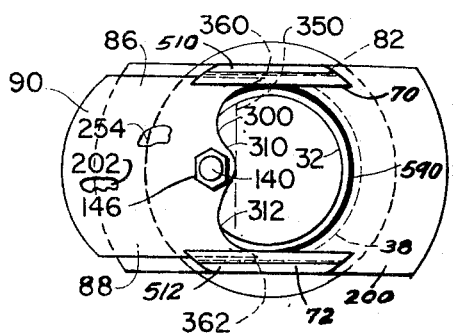
FIG. 3 is a rear elevation of the valve shown without its nut and gaskets in place.

As best seen in FIG. 3, the water guide member or handle 140 is disposed in the flow passage 32 and at one edge of the gate 90, that edge being indicated at 300 in FIG. 3.

It is possible that the edge 300 be provided with an upper recess 310 and a lower recess 312 disposed above and below the place of the mounting of the handle 140. This structure is such that when the gate is closed, the passage 32 is completely closed, but also that when the gate is open to its fullest extent and with its handle 140 striking the opposite side of the wall of the passage 32, as shown in FIG. 3, then a certain amount of extra flow through the gate is possible than would be the case if the edge 300 were straight and at a right angle to the top and bottom edges 86 and 88. To illustrate this point, a dotted line is shown at 350 to indicate the depth of the recesses 310 and 312.

To illustrate the depths of the recesses 310 and 312, a dotted line 350 is shown to indicate the position of the respective edge of the gate 90 if the edge were disposed at a right angle to the gate top and bottom edges 86 and 88. It will be seen that a considerable area of extra flow space is provided by the recesses 310 and 312.

It is desirable that the upper and lower corners of the gate 90 which are shown respectively at 360 and 362 be disposed as far as possible toward the opposite side of the body 30 from the gate open position of the handle 140 as possible without the edge 310 lapping the inner end of the flow passage 32 at either upper or lower corners 360 and 362 of the gate 90 along its edge 312. The structure is expressed in this way because a maximum amount of gate 90 material should be disposed within the grooves 82 as possible to give the gate good support and free sliding, and yet, a minimum amount of gate material should be in the way of flow of water through the flow passage 32, although some gate material is necessarily in the way of flow of water in order to give support to that area of the gate 90 which must lap the flow passage 32 in order to support the water guide member or handle 140.

The outer gasket 122 is actually a bearing member and is preferably formed of stiff material and has a cavity 370 extending from right to left along its inner side similar to the underside of a saddle and a shape of a portion of a cylinder identical to the shape and size of the outer surface of the pipe so as to fit snugly thereagainst. The outer surface 380 of the thrust member or bearing member 122 and which can also be described as the outer gasket 122, lies along a plane which is transverse to the axis 40 which is parallel to the axis of the cylindrical pipe 10 so as to receive the pressure of the nut 120.

It will be seen that the flanges 200 and 202 each extend a considerably greater distance from the axis 40 than do the top and bottom flanges 70 and 72. This is workable because during mounting, the valve body is inserted into an opening in the pipe while the axis 40 of the valve body is parallel to the length of the pipe and is moved at a right angle to the length of the pipe and at a right angle to the axis 40. This is illustrated in FIG. 2 in which a dotted circle 500″ is superimposed on the valve to diagrammatically illustrate the position of a hole in the pipe with respect to the valve at a time when the length of the pipe is disposed at a right angle to the position it is in as shown at 10 in full lines in FIG. 2.

The circle 500″ will be seen to include within its boundaries the outermost parts of the outer end 48 of the valve body.

Figure 2:
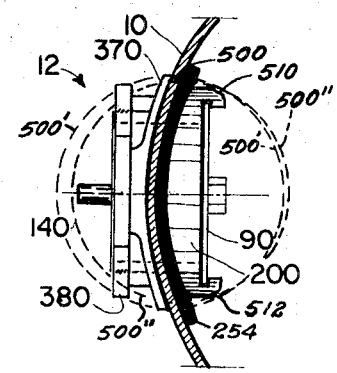
FIG. 2 is a right end elevation of the valve and pipe portion of FIG. 1.

As best seen in FIG. 2, the inner sides of the top and bottom flanges have inclined surfaces when seen in end view in those areas thereof which are disposed at the top and the bottom of the valve body on the upper inner side of the top flange 70 and on the lower inner side of the bottom flange 72. These beveled surfaces can best be seen in FIG. 2 at 510 and 512 and they are preferably inclined in a manner such that they are disposed each parallel to a tangent of the circle 500″ at times when the valve is in the position shown in FIG. 2 for entrance into a pipe hole having the position 500″ shown in dotted lines in FIG. 2 rather than the position of the pipe hole at times when the valve is mounted on the pipe, which latter position is shown at 500″ in FIG. 2 in dotted lines.

The saddle bearing member 122 will be seen to have a ring-shaped protrusion 530 which is concentric about the axis 40 and which extends from the inward side of and is a part of the remainder of the outer gasket 122. The outer diameter of the ring-shaped protrusion 530 is very, very sightly less than the diameter of the opening 500 in the pipe for giving a good fit to present the innermost surface of the protrusion 530 against the maximum amount of the area of that part of the gasket 254 which is opposite the opening 500.

The inner diameter of the protruding ring 530 is but slightly more than the outer diameter of the body 30 which is substantially the outer diameter of the cylindrical threaded external surface 38 of the body, whereby the ring 530 gives the gasket 254 good support also at the inner diameter of the annular washer-shaped gasket 254. On the body side of the sliding gate 90 is a gate-facing surface 560 of annular shape and disposed in a plane at a right angle to the axis 40 and in which is provided a circular groove which receives an O-ring which is a resilient ring-shaped gasket of circular cross-section, the O-ring being seen at 590.

The O-ring is embedded in the O-ring groove 570 a distance of more than half of the thickness of the O-ring.

In operation, it will be found that the valve, as shown, will give a maximum amount of flow, much greater than screw type valves for a given size of pipe opening. In using the valves of this invention to replace screw type valves of the prior art, it will be found that the beveled surfaces 510 and 512 are important in making this valve fit a standard hole of two and three-eighths inches in diameter while providing a flow opening in this valve which is of maximum size and giving a greater flow than is possible with screw type valves.

In FIG. 2 a second dotted circle 500′ illustrates a position of a pipe opening with respect to the valve which is not used because it is of an undesirably large diameter and conventionally large, whereas it is the desire to have this valve fit into the small two and three-eighths-inch pipe opening used by prior art rotary valves for ease of replacement thereof.

The desire to replace prior art valves in two and three-eighths-inch pipe openings has been a factor requiring invention in its solution. The beveling at 510 and 512 being part of a solution, permitting the valve of this invention to have a flow opening of maximum size.

The preferred relative position of the opening 500 during insertion is shown by the circle 500″ in FIG. 2 to be close to the outer end 48 of the body, as is possible because the bearing member 370 and hexagonal wrench-receiving nut 120 are not on the valve during insertion, but are applied to it thereafter.

The way in which the protrusion 530 covers a maximum of the outer side of the gasket 284 holding it firmly in place, makes the valve of this invention a more perfect high pressure valve than prior art valves having protrusion in the area of the protrusion 530 but which do not extend as far out toward the edge of the pipe opening.

As thus described, it will be seen that this invention has fulfilled the objectives above set forth in providing a gate valve especially adapted for high pressure which has a maximum flow opening in proportion to a given size of pipe opening into which it fits, solving the problem of greater flow to be accomplished by a valve of the type applied through a single pipe opening and held by a single nut.

I claim:

1. A gate valve for mounting in an opening in a side of an elongated irrigation pipe comprising: an annular valve body having a flow passage therethrough and having a substantially cylindrical external surface which is threaded at its outer end, the said substantially cylindrical surface having an axis, said body having an inner end and an outer end spaced along said axis, said body having the walls of its flow passage disposed longitudinally of said axis, flange means attached to the inner end of said body and projecting from said body radially of said axis on substantially all sides of said body to provide shoulder means facing the outer end of said valve body, an annular resilient gasket disposed around said body against said shoulder means and lapping said pipe, a gate extending across the inner end of said body, means slidably attaching said gate on said flange means for movement of said gate across said body transversely of said axis to open and close said passage, said body, said flange means and said shoulder means forming a stationary assembly of a size for insertion into said pipe through said pipe opening by moving it through said pipe opening in a direction transversely of said axis, said body being positioned extending through said pipe opening and having its axis transverse to said pipe, a bearing member substantially surrounding said body and disposed on the outer side of said pipe, means on the outside of said body and secured thereto for pressing said bearing member against said pipe, said flange means on two opposite sides of said axis extending away from said axis a distance substantially less than the distance the walls of said pipe opening are from said axis, and said flange means on a different two opposite sides of said pipe opening axis lapping the inner side of said pipe.

2. The combination of claim 1 in further combination with: said body having a groove on its inner side opposite said gate and extending around said flow passage, a resilient annular O-ring disposed partially in said groove and extending outwardly into pressing engagement with said gate.

3. The gate valve of claim 1 in which said pipe opening is substantially circular.

4. The combination of claim 1 in which an elongated water guide member is attached to said gate and extends generally parallel to said axis as seen from a side of said body which is to one side of the line of sliding movement of said gate so that water flowing through said passage tends to follow and be guided by said water guide member.

5. The combination of claim 1 in which said means slidably attaching said gate comprises grooves on the axis side of said flanges receiving edges of said gate slidably therein.

6. The combination of claim 5 in which said body has flange means on substantially all sides of the inner end thereof.

7. The combination of claim 1 in which a gate position control member is attached to said gate and extends away from the outer side thereof and is disposed adjacent one edge of said gate, the said one edge of said gate having recesses therein disposed on each side of said control member, said control member being disposed substantially midway between the said two opposite sides of said body.

8. The combination of claim 1 in which said means slidably attaching said gate comprises grooves on the axis side of said flanges, said grooves receiving edges of said gate slidably therein, said flange means adjacent said grooves having beveled terminal inwardly facing surfaces, said beveled surfaces facing away from said gate grooves and being disposed at an inclination both with respect to said axis and with respect to a plane at a right angle to said axis, whereby the shape of said flange means with said beveled surfaces facilitates the passage of said valve through a circular opening of minimum size.

9. The combination of claim 1 in further combination with said bearing member having an annular portion lapping said pipe on all sides of said pipe opening, said bearing member having protrusion means on its inner side and said protrusion means having inwardly facing gasket-engaging surface means at the top and bottom of said body and extending outwardly from said axis to positions close to the wall of said pipe opening and extending inwardly toward said axis a substantial distance and engaging the outer side of said inner gasket and of a size such that when said bearing member is being pressed toward said pipe said protrusion will force said gasket against said shoulder.

10. The combination of claim 9 in which said opening is of substantially circular shape.

References Cited

UNITED STATES PATENTS

| | | | |
|---|---|---|---|
| 2,697,582 | 12/1954 | Grosch | 251—145 |
| 2,799,469 | 7/1957 | Kelly | 251—145 |
| 2,901,211 | 8/1959 | Epp | 251—145 |
| 2,925,244 | 2/1960 | Fox | 251—145 |
| 3,033,514 | 5/1962 | Grosch | 251—145 |
| 3,319,927 | 5/1967 | Thompson | 251—145 |
| 3,345,034 | 10/1967 | Sherman | 251—145 X |

M. CARY NELSON, Primary Examiner

W. R. CLINE, Assistant Examiner